2 Sheets—Sheet 1.
P. W. PECKHAM.
ASH-SIFTER.
No. 185,571. Patented Dec. 19, 1876.
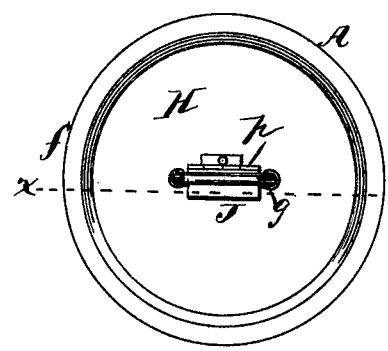
Fig. I
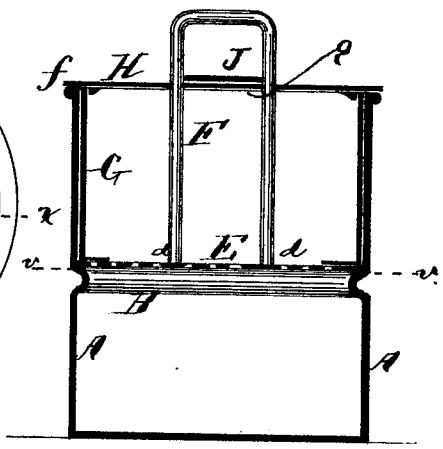
Fig. II
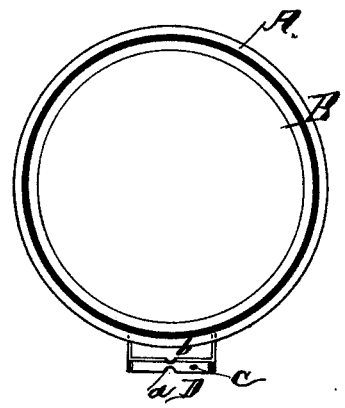
Fig. III
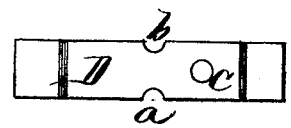
Fig. IV
Witnesses:
F. Barritt
Richard Gernier
Inventor:
Peter W. Peckham
Per: Henry Gerner,
Atty.
THE GRAPHIC CO. N.Y.

2 Sheets—Sheet 2.
P. W. PECKHAM.
ASH-SIFTER.
No. 185,571. Patented Dec. 19, 1876.
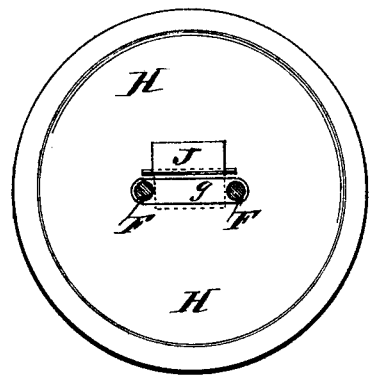
Fig. V.
Witnesses:
F Barrett
Richard Germer
Inventor:
Peter W. Peckham
Per
Henry Germer,
Att'y

UNITED STATES PATENT OFFICE.

PETER W. PECKHAM, OF NEW YORK, N. Y., ASSIGNOR TO SUSAN L. AND CLARA N. STAVERS, OF EXETER, NEW HAMPSHIRE.

IMPROVEMENT IN ASH-SIFTERS.

Specification forming part of Letters Patent No. 185,571, dated December 19, 1876; application filed September 22, 1876.

*To all whom it may concern:*

Be it known that I, PETER W. PECKHAM, of New York city, county, and State of New York, have invented new and useful Improvements in Coal-Sifters; and I declare the following to be a full and clear description of the same, which will enable others to make and use my improved coal-sifter.

My invention relates to sifting-coal from the ashes and cinders, which is done by placing a perforated disk inside about in the middle of a cylindrical vessel. This perforated disk or coal-sifter rests on a rim all around on the inside of the cylindrical vessel. On the top of the perforated disk or the coal-sifter is placed a cylinder fitting loosely inside the cylindrical vessel. This cylinder may be fastened to the perforated disk, or it may simply rest loosely on the top of the disk without being fastened, or it may be dispensed with altogether at the option of the user of the coal-sifter.

The coals to be sifted are placed on the top of the perforated disk, which is revolved inside of the cylinder by aid of the handle.

The handle, which consists of a bent bar, is riveted to the perforated disk, and extends upward over the opening of the cylindrical vessel, on the top of which is placed a cover, which is provided with a rim, so as to fit inside the cylindrical vessel in order to prevent the exit of ashes and dust when the coals are sifted. This cover is provided with a slot in the middle, through which the handle extends upward over the cover. A lid on the cover over the center of the slot closes the opening between the arms of the handle and prevents the ashes and dust from escaping. By revolving the handle and the perforated disk the cover is also revolved.

On the outer side of the lower part of the cylindrical vessel is fastened a handle, which serves for two purposes, viz: first, for tipping over the cylindrical vessel when the ashes or refuse is to be removed from the same; and, secondly, for fastening or holding the cylindrical vessel to the wall of a room in order to prevent its being moved in the act of sifting the coal.

By driving simply a nail into the wall and pushing the handle up to the same, and seeing that the nail fits into either a hole in the handle or into one of the notches on the top or the lower side, the cylindrical vessel will be held steady to the wall.

In order to describe my invention more fully, I refer to the accompanying drawings, forming a part of this specification.

Figure I is a top view of my improved coal-sifter. Fig. II is a sectional view through line $x\ x$, Fig. I. Fig. III is a plan sectional view on line $v\ v$, Fig. II. Fig. IV is a detached front view of the handle, fastened to the cylindrical vessel. Fig. V is a top view of my improved ash-sifter, with the lid, covering the slot in the cover, thrown back.

A is the cylindrical vessel with rim B and handle D, with notches $a\ b$ and hole $c$. E is the perforated disk or coal-sifter, with handle F riveted at $d\ d$ to the disk. G is the cylinder inside of the cylindrical vessel A, and resting on the disk E, to which it may be fastened, if so desired. H is the cover with rim $f$ and slot $g$. J is the lid, covering the center, of the slot $g$, and hinged at $p$ to the cover H.

Having thus described my invention, I desire to claim—

1. The revolving sieve E, provided with the handle F, in combination with the cylindrical vessel A, provided with the rib B and lid H, substantially as described.

2. The cover H, with rim $f$, slot $g$, and lid J, substantially as shown, and for the purpose set forth.

This specification signed this 16th day of August, 1876.

P. W. PECKHAM.

Witnesses:
RICHD. GERNER,
F. BARRITT.